April 17, 1928.
H. BANY
1,666,435
SYSTEM OF ELECTRIC DISTRIBUTION
Original Filed Jan. 8. 1926
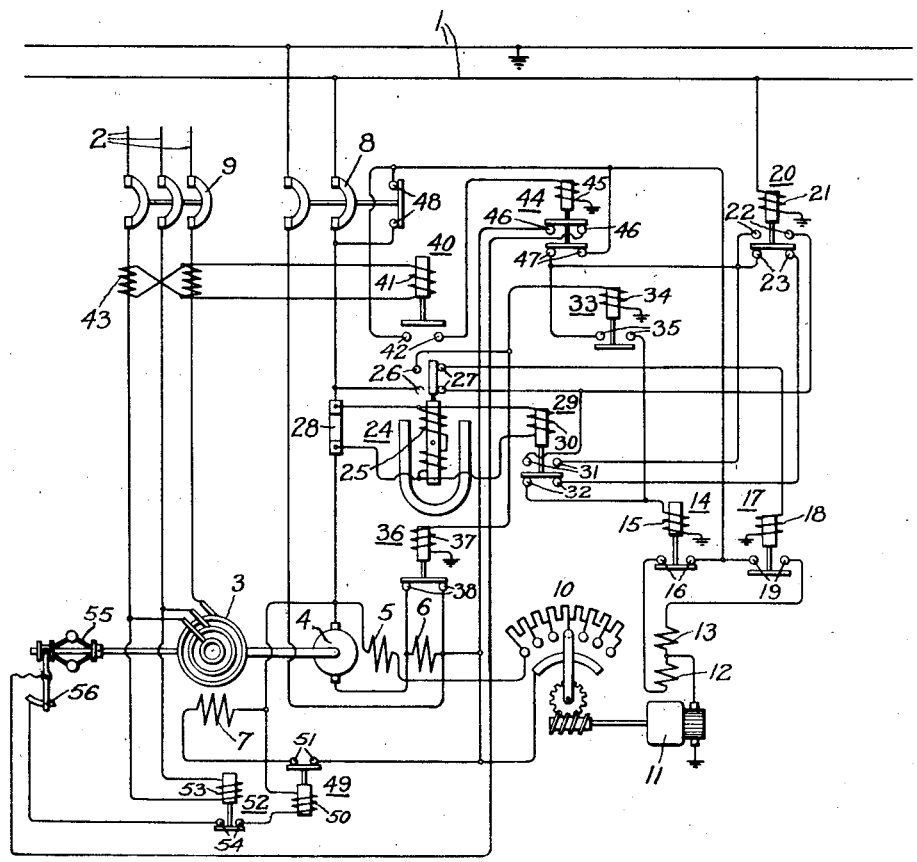
Inventor:
Herman Bany:
by *Alexander S. ____*
His Attorney.

Patented Apr. 17, 1928.

1,666,435

UNITED STATES PATENT OFFICE.

HERMAN BANY, OF SCOTIA, NEW YORK, ASSIGNOR TO GENERAL ELECTRIC COMPANY, A CORPORATION OF NEW YORK.

SYSTEM OF ELECTRIC DISTRIBUTION.

Application filed January 8, 1926, Serial No. 80,050. Renewed February 4, 1928.

My invention relates to electrical distribution systems, particularly systems comprising a supply circuit and a load circuit interconnected by dynamo-electric units, and has for its principal object to provide an improved arrangement for controlling the operation of the interconnecting dynamo-electric units upon the occurrence of a reversal of energy flow therethrough.

The present invention is especially adapted for use in connection with a system of distribution which comprises an alternating current supply circuit and a direct current load circuit interconnected by a plurality of semi-automatically or automatically operated synchronous-motor-generator substations, in which regulating means are provided for the generators to maintain the voltage constant at some particular point in the load circuit. In systems of this type a direct current reversal of energy flow may be experienced as a result of low voltage in a substation, or as a result of a failure of alternating current power supply to one of the stations. In the former case, it is desirable to bring the generator voltage up to the system voltage in order to terminate the reversal of energy flow, and in the latter case it is desirable to disconnect any field control voltage regulating means, because weakening the field of the generator, which is motoring, may cause overspeed, whereas, strengthening the field of the generator would make it difficult to synchronize the motor upon the return of the alternating current supply.

In accordance with my invention improved regulating means are provided to control the operation of a generator during a reversal of energy flow therethrough irrespectively of the operation of means which normally control the generator to maintain constant a predetermined electrical condition of the circuit to which the generator is connected.

My invention will be better understood from the following description taken in connection with the accompanying drawing in which the single figure is a diagrammatic representation of one embodiment of the invention, and its scope will be pointed out in the appended claims.

Referring to the drawing, a direct current distribution circuit, designated herein as a direct current load circuit, is indicated by conductors 1, and is interconnected with a supply circuit 2, shown as a three-phase alternating current line, by means of substations comprising rotary transforming means and control equipment. The load circuit 1 and supply circuit 2 may be interconnected by a suitable number of substations; illustration of more than one being omitted from the drawing for the sake of simplicity and clearness. In the arrangement, as illustrated, the rotary transforming means is shown as a motor-generator set comprising a synchronous motor 3, mechanically connected to, and here shown as mounted on the same shaft with, a direct current generator 4. Generator 4 is provided with a field winding 5 and a differential series field winding 6. Field winding 5 may be excited in any desirable manner by a convenient source of current and is here shown as excited from generator 4. Synchronous motor 3 is of the well known type with a squirrel cage starting winding and is provided with a field winding 7 arranged to be energized from a convenient source of direct current, here shown as generator 4. Any suitable means, such as circuit breakers 8 and 9 are provided to connect generator 4 and synchronous motor 3 to the load circuit 1 and supply circuit 2, respectively. These circuit breakers may be controlled by automatic switching means, examples of which are well known in the art, but since they do not constitute a part of my invention, I deem it unnecessary to show such means in detail. The field winding 7 of synchronous motor 3 is arranged to be energized from the direct-current generator 4 although any other convenient source of direct current may be provided. The voltage of generator 4 is controlled by means of an automatically operated rheostat 10 in the shunt field circuit 5. Rheostat 10 is shown as being operated by means of a pilot-motor 11, which is provided with reversely connected field windings 12 and 13.

The various circuits in the arrangement shown in the drawing are controlled by relays and auxiliary switches discussed in some detail in the following description. For simplicity of illustration the load circuit is shown with one side permanently connected to ground, and hence a circuit for an operating coil of a relay is completed from the ungrounded side of the system through the coil to the ground; but it will be apparent that the invention is not limited to such a system.

A voltage raising control relay 14 comprising a coil 15 and contacts 16 is associated with rheostat 10 and arranged when energized to complete a circuit for motor 11 and its field winding 12, so that motor 11 operates in a direction to cut out the resistance in the field circuit of generator 4. A voltage lowering relay 17 comprising a coil 18 and contacts 19 is also associated with rheostat 10 and arranged when energized to complete a circuit for motor 11 and its field winding 13, so that the motor operates in a direction to insert resistance in the field circuit of generator 4. A voltage regulating relay 20 comprising a coil 21 and contacts 22 and 23 is energized from the load circuit 1 and is arranged to control the energization of relays 14 and 17. The connection of the voltage regulating relay 20 is made at such a point in the load circuit as will make it possible to maintain the voltage constant at the load center, which may be at the station bus or at a predetermined point of some particular feeder.

A power directional relay 24 comprising an operating coil 25 and contacts 26 and 27 is arranged to be energized from a shunt 28 in series with the generator leads to the load circuit 1. A direct current load regulating relay 29 comprising an operating coil 30 and contacts 31 and 32 is also connected across shunt 28, and is arranged to control relay 17 if the generator delivers more than a predetermined current and to control relay 14, depending on the operation of relay 20, when the generator current is below a predetermined value. The power directional relay 24 is instrumental in controlling the energization of relay 33, which comprises a coil 34 and contacts 35. When energized relay 33 permits control of voltage raising relay 14 independently of the voltage regulating relay 20. Power directional relay 24 also controls relay 36 which comprises a coil 37 and contacts 38, and when energized upon reversal of energy flow inserts the differential field winding 6 of generator 4. An alternating current underload relay 40 comprising a coil 41 and contacts 42 is energized from current transformers 43 arranged in series relation with the alternating current lines to the synchronous motor 3. In case the alternating current to the synchronous motor 3 falls below a predetermined value, relay 40 is arranged to close its contacts 42 and is instrumental in completing a circuit for relay 44 which comprises a coil 45 and contacts 46 and 47. When relay 44 is energized, its contacts 47 open and prevent the completion of a circuit for the operating coils 15 and 18 of relays 14 and 17, respectively. Auxiliary contacts 48 are associated with circuit breaker 8 and are arranged to be closed when circuit breaker 8 is closed and open when circuit breaker 8 is open. A means is thereby provided for completing a break in the circuit or introducing a break in the circuit of the operating coils of relays 14, 17 and 44, depending on the position of direct current circuit breaker 8. A field contactor 49 comprising an operating coil 50 and contacts 51 is provided for the synchronous motor field circuit and is arranged to be energized from the direct current generator 4. A relay 52 comprising a coil 53 and contacts 54 in the circuit of coil 50 of relay 49 is arranged to be energized from the alternating current mains 2. If the voltage across the terminals of synchronous motor 3 is below a predetermined value, relay 52 will be deenergized and will interrupt the energizing circuit for field contactor 49. However, if synchronous motor 3 is being driven from the direct current end, even though the alternating current supply is interrupted, relay 52 may not operate to interrupt the energizing circuit of relay 49. Hence, another interrupting circuit for relay 49 is provided by having contacts 46 of relay 44 in series with contacts 54 of relay 52 so that when relay 44 is operated, by reason of low current or a failure of current to synchronous motor 3, the energizing circuit of relay 49 is interrupted. A speed responsive device 55, connected to the movable element of synchronous motor 3, is adapted to open its contacts 56 when the speed of the synchronous motor drops below a predetermined value, thereby interrupting the circuit for operating coil 50 of relay 49. If the energizing circuit of relay 49 is interrupted under any of the circumstances just related, its contacts 51 open and interrupt the synchronous motor field circuit. This permits induction motor operation for limited periods in emergencies when the synchronous motor pulls out of synchronism with the supply circuit and facilitates motor synchronization when normal conditions are restored.

The operation of the embodiment of my invention shown is as follows: Assume that it is desirable to connect generator 4 to the load circuit 1 which is energized by other sources of current (not shown) and that supply circuit 2 is energized. Circuit breaker 9 is closed. At a predetermined voltage, relay 52 will be energized and will close its contacts 54 in the circuit of synchronous motor field contactor 49, but speed responsive device 55 will prevent completion of the energizing circuit for relay 49 until a predetermined speed is attained. In the meantime the squirrel-cage winding of synchronous motor 3 will provide a torque to accelerate the motor to near synchronous speed in a manner well known. As soon as a predetermined speed, such as 95% of synchronous speed, is attained, contacts 56 of relay 55 close to complete the circuit for field contactor 49 which closes its contacts 51 to complete a circuit for the synchronous motor field winding 7 from generator 4. As soon as field is applied the synchronous motor pulls into synchronism. The direct current generator 4 being directly connected to synchronous motor 3 will come up to speed simultaneously therewith and is connected to the supply circuit 1 by means of circuit breaker 8 when its voltage is equal to or slightly higher than the load circuit voltage. When circuit breaker 8 is closed its auxiliary contacts 48 will close and complete a break in the energizing circuit of relays 14, 17 and 44 which operate in a manner described hereinafter.

The voltage regulating relay 20 is arranged to close its lower contacts 23 when the voltage of the load circuit is below a predetermined value thereby completing a circuit for the operating coil 15 of relay 14 from the ungrounded side of the direct current generator line, through contacts 48, contacts 47, contacts 23, contacts 32, coil 15, to the ground. When relay 14 is energized, its contacts 16 are closed and a circuit for pilot motor 11 is completed from the ungrounded side of the direct current circuit, through contacts 48, contacts 16, field winding 12, the pilot motor armature, to the ground. Under the influence of field winding 12, motor 11 is arranged to rotate in a direction to decrease the resistance 10 in the shunt field circuit 5 of generator 4 and thereby increase the generator voltage. Should the load-circuit voltage be too high, relay 20 closes its upper contacts 22 and completes a circuit to energize the relay 17 at the same time deenergizing relay 14 and interrupting the circuit through field winding 12. A circuit is now established from the ungrounded side of the load circuit, through contacts 48, contacts 47, contacts 22, contacts 27, coil 18 of relay 17, to the ground. When relay 17 is energized, its contacts 19 are closed and a circuit is completed from the ungrounded side of the direct current circuit through contacts 48, contacts 19, field winding 13, the pilot-motor armature, to the ground. Under the influence of field winding 13, motor 11 is arranged to rotate in a direction to increase the resistance 10 in the shunt field circuit 5 of generator 4 and thereby decrease the generator voltage. This automatic voltage regulation is carried out in accordance with predetermined conditions and normal running conditions are now obtained.

In case of a reversal of energy flow, which may occur if for some reason the direct current generator voltage becomes lower than the system voltage, it becomes desirable to bring the motor-generator operation back to normal. If the voltage regulating relay is arranged to regulate for voltage at some point in the distribution system, the proper operation of the automatic rheostat will not occur under control of the voltage regulating relay 20 to quickly terminate the reversal of energy flow. In order to prevent feed-back of energy to the alternating current supply circuit, a power directional relay 24 is arranged to control relay 33 which permits control of the voltage raising relay 14 irrespectively of the operation of voltage regulating relay 20. Upon a reversal of energy flow, contacts 26 of relay 24 are closed and an energizing circuit is completed for relay 33 which operates to close its contacts 35. At the same time contacts 27 of relay 24 open and voltage lowering relay 17 is removed from all control. With the operation of relay 33 a circuit is completed for voltage raising relay 14 from the ungrounded side of the load circuit, through contacts 48, contacts 47, contacts 35, operating coil 15 of relay 14, to the ground. Motor 11 is energized and rotates in a direction to decrease the resistance in the shunt field circuit 5 of generator 4 and thereby increases the voltage of the generator the desired amount to terminate the reversal of energy flow.

When contacts 26 of the power directional relay 24 close, relay 36 is energized and its contacts 38 open, thereby cutting in the differential series field winding 6 of generator 4 and permitting the direct current generator to operate as a compound-wound motor so long as the reversal of energy flow continues.

If the reversal of energy flow is due to an interruption of the alternating current circuit to the synchronous motor relay 40, normally energized from current transformers 43, would be deenergized and close its contacts 42 to complete a circuit for operating coil 45 of relay 44, from the ungrounded side of the direct current circuit, through contacts 48, contacts 42, coil 45, to the ground. Contacts 46 of relay 44 are now opened to interrupt the circuit of field contactor 49 of synchronous motor 3 and contacts 47 of the same relay are opened to interrupt the circuits controlled by voltage regulating relay 20 and relay 33 so that these relays are rendered inoperative to control the excitation of direct current generator 4. The power directional relay 24, having closed its contacts 26, will complete the operating coil circuit of relay 36 which opens its contacts 38 to insert the differential series field winding 6 of generator 4. This tends to stabilize the speed and prepare the motor for resynchronization upon the restoration of alternating current power.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. In a system of distribution, an electric circuit, a source of current connected to said circuit, a relay responsive to the direction of current flow between said source and circuit, and means controlled by the relay for adjusting the voltage of said source to terminate a flow of energy from said circuit to said source irrespectively of the voltage of said circuit.

2. In a system of distribution, an electric circuit, a generator connected to said circuit and normally arranged to supply current thereto, a field circuit for said generator, and a directional relay responsive to a reversal of current through said generator for effecting an increase in the current through said field circuit so long as said reversal of current exists.

3. In a system of distribution, a direct current circuit, a generator connected to said circuit and normally arranged to supply current thereto, a shunt field winding for said generator, an adjustable rheostat in the shunt field circuit of said generator, and means responsive to a reversal of current through said generator for effecting the adjustment of said rheostat to decrease the resistance of the shunt field circuit so long as said reversal of current exists.

4. The combination of a generator and a circuit connected thereto, means responsive to the voltage of said circuit for controlling the excitation of said generator, and means responsive to the direction of current flow between said generator and circuit for controlling the operation of said excitation controlling means irrespectively of the amount of said reversed current.

5. In a system of distribution, an electric circuit, a generator connected to said circuit and normally arranged to supply current thereto, a relay arranged to effect an increase in the excitation of said generator, another relay arranged to effect a decrease in the excitation of said generator, means normally arranged to control the operation of said relays, and a power directional relay for effecting the operation of said first mentioned relay and for removing the other of said relays from the control of said control means upon the occurrence of a reversal of current through said generator.

6. In a system of distribution, an electric circuit, a source of current connected to said circuit, automatic regulating means normally arranged to maintain constant a predetermined electrical condition of said circuit, and means responsive to a reversal of current through said source for effecting an increase in the voltage of said source so long as said reversal of current exists irrespectively of the value of the predetermined electrical condition of said circuit which is normally maintained constant.

7. In a system of distribution, an electric circuit, a generator for supplying current to said circuit, automatic regulating means normally arranged to control the excitation of said generator to maintain constant the voltage of said circuit, and means responsive to a reversal of current through said generator for causing said automatic regulating means to increase the excitation of said generator so long as said reversal of current exists irrespectively of the voltage of said circuit.

8. In a system of distribution, an electric circuit, a generator for supplying current to said circuit, a relay arranged when energized to effect an increase in the excitation of said generator, a second relay arranged when energized to effect a decrease in the excitation of said generator, control means responsive to an electrical condition of said circuit normally arranged to control the energization of said relays, and means responsive to a reversal of current through said generator for effecting the energization of said first mentioned relay independently of said control means.

9. In a system of distribution, an electric circuit, a generator for supplying current to said circuit, a relay arranged when energized to effect an increase in the excitation of said generator, a second relay arranged when energized to effect a decrease in the excitation of said generator, control means responsive to an electrical condition of said circuit normally arranged to control the energization of said relays, and means responsive to a reversal of current through said generator for effecting the energization of said first mentioned relay independently of said control means and for removing said second relay from the control of said control means.

10. In a system of distribution, an electric circuit, a generator for supplying current to said circuit, an adjustable rheostat in the field circuit of said generator, automatic means for adjusting said rheostat comprising a relay arranged when energized to effect a decrease in the amount of resistance in the field circuit and a second relay arranged when energized to effect an increase in the amount of resistance in the field circuit, a control device responsive to the voltage of said electric circuit for effecting the completion of a circuit for said first mentioned relay when the voltage of said electric circuit is below a predetermined value and for effecting the completion of a circuit for said second relay when the voltage o said electric circuit is above a predetermined value, and means controlled by the direction of flow of current through said generator for controlling the circuit of said second mentioned relay and a second circuit for said first mentioned relay.

11. In a system of distribution, an electric circuit, a generator for supplying current to said circuit, an adjustable rheostat in the field circuit of said generator, automatic means for adjusting said rheostat comprising a relay arranged when energized to effect a decrease in the amount of resistance in the field circuit and a second relay arranged when energized to effect an increase in the amount of resistance in the field circuit, a control device responsive to the voltage of said electric circuit for effecting the completion of a circuit for said first mentioned relay when the voltage of said electric circuit is below a predetermined value and for effecting the completion of a circuit for said second relay when the voltage of said electric circuit is above a predetermined value, and means controlled by the direction of flow of current through said generator for effecting the completion of a circuit for said first mentioned relay and for removing said second relay from the control of said control device when the current to said generator reverses.

12. In a system of distribution, a supply circuit, a load circuit, rotary transforming means connected between said circuits and normally arranged to transfer energy from said supply circuit to said load circuit, automatic regulating means normally arranged to vary the voltage impressed upon said load circuit to maintain constant a predetermined characteristic of said load circuit, means responsive to a reversal of current through said transforming means for effecting a change in the voltage impressed upon said load circuit by said transforming means irrespectively of the value of said predetermined characteristic which is normally maintained constant, and means for rendering said automatic regulating means and said reverse current responsive means inoperative to control the voltage impressed upon said load circuit when said supply circuit is interrupted.

13. In a system of distribution, a supply circuit, a load circuit, a motor-generator set connected between said circuits and normally arranged to transfer energy from said supply circuit to said load circuit, automatic regulating means normally arranged to vary the excitation of said generator to maintain constant the voltage of said load circuit, means responsive to a reversal of current through said generator for effecting an increase in the excitation of said generator, and means responsive to the current flowing between said supply circuit and the motor of said motor generator set for rendering said automatic regulating means and said reverse current responsive means inoperative to control the excitation of said generator when said current is below a predetermined value.

14. In a system of distribution, a supply circuit, a load circuit, rotary transforming means connected between said circuits and normally arranged to transfer energy from said supply circuit to said load circuit, power directional means for effecting an increase in the voltage impressed upon said load circuit by said transforming means when said means operates invertedly, and means for rendering said power directional means inoperative to effect an increase in the voltage impressed upon said load circuit when the inverted operation of said transforming means is caused by an interruption of said supply circuit.

15. In a system of distribution, a supply circuit, a load circuit, a motor generator set connected between said circuits and normally arranged to transfer energy from said supply circuit to said load circuit, means responsive to a reversal of current through the generator of said motor generator set for increasing the excitation of said generator, and means for rendering said excitation increasing means inoperative when the reversal of current through said generator is caused by an interruption of said supply circuit.

16. In a system of distribution, a supply circuit, a load circuit, a motor generator set connected between said circuits and normally arranged to transfer energy from said supply circuit to said load circuit, a field circuit for said generator, an adjustable rheostat in said field circuit, means responsive to a reversal of current through the generator of said motor generator set for effecting the operation of said rheostat to increase the excitation of said generator, and means responsive to the current flowing between the motor of said motor generator set and said supply circuit for removing the control of said rheostat from said reverse current responsive means when the supply circuit current is below a predetermined value.

17. In a system of distribution, an electric circuit, a source of current connected to said circuit, means responsive to the voltage of said circuit for controlling the voltage of said source, means responsive to the magnitude of the current traversing said source in a predetermined direction for modifying the operation of said first-mentioned means, and means responsive to a flow of current in the reverse direction through said source for increasing the voltage of said source irrespectively of the magnitude of said reversed current and independently of the operation of said first- and second-mentioned means.

18. In a system of distribution, an electric circuit, a source of current connected to said circuit, means responsive to the voltage of said circuit for controlling the voltage of said source, means responsive to the magnitude of the current traversing said source in a predetermined direction for preventing raising of the voltage of said source by said first-mentioned means when said current is above a predetermined value, and a directional relay for permitting normal operation of said voltage responsive means and current responsive means when current flows from said source to said circuit and for increasing the voltage of said source independently of the operation of said voltage responsive means and said current responsive means when current flows from said circuit to said source.

In witness whereof, I have hereunto set my hand this 6th day of January, 1926.

HERMAN BANY.